United States Patent [19]

Kumamaru et al.

[11] Patent Number: 5,433,286
[45] Date of Patent: Jul. 18, 1995

[54] MOTORCYCLE

[75] Inventors: Junji Kumamaru, Saitama; Hirotoshi Toyama, Tokyo, both of Japan

[73] Assignee: Honda Giken Kogyo Kabushiki Kaisha, Tokyo, Japan

[21] Appl. No.: 221,992

[22] Filed: Apr. 1, 1994

Related U.S. Application Data

[63] Continuation of Ser. No. 890,380, May 26, 1992, abandoned, which is a continuation of Ser. No. 686,307, Apr. 16, 1991, abandoned, which is a continuation of Ser. No. 413,907, Sep. 27, 1989, abandoned.

[30] Foreign Application Priority Data

Sep. 27, 1988 [JP] Japan ................. 63-239680
Sep. 27, 1988 [JP] Japan ................. 63-239681

[51] Int. Cl.⁶ ............................................ B62D 61/02
[52] U.S. Cl. ................................. 180/219; 180/227; 280/833
[58] Field of Search ............... 180/219, 225, 227, 228, 180/229; 280/833, 834, 835

[56] References Cited

U.S. PATENT DOCUMENTS

| | | | |
|---|---|---|---|
| 2,225,914 | 12/1940 | Lewis et al. | 280/219 |
| 3,779,597 | 12/1973 | Uchida | 296/37 |
| 3,788,532 | 1/1974 | Bish | 224/32 A |
| 3,882,951 | 5/1975 | Conley | 123/41.49 |
| 4,265,332 | 5/1981 | Presnall et al. | 181/211 |
| 4,428,451 | 1/1984 | Yamaoka | 180/229 |
| 4,438,877 | 3/1984 | Jackson | 224/275 |
| 4,441,574 | 4/1984 | Kohyama et al. | 180/219 |
| 4,519,473 | 5/1985 | Ochiai et al. | 180/229 |
| 4,522,442 | 6/1985 | Takenaka | 296/37.1 |
| 4,577,719 | 3/1986 | Nomura et al. | 180/219 |
| 4,579,190 | 4/1986 | Hashimoto et al. | 180/227 |
| 4,619,476 | 10/1986 | Kawasaki | 296/37.1 |
| 4,633,965 | 1/1987 | Tsurumi et al. | 180/229 |
| 4,666,009 | 5/1987 | Yashima et al. | 180/219 |
| 4,679,647 | 7/1987 | Komuro | 180/219 |
| 4,697,664 | 10/1987 | Kohyama | 180/219 X |
| 4,721,178 | 1/1988 | Ito | 180/219 |
| 4,726,439 | 2/1988 | Iwao | 180/219 |
| 4,915,188 | 4/1990 | Ota et al. | 180/219 |
| 4,964,483 | 10/1990 | Yokoyama et al. | 180/219 |

FOREIGN PATENT DOCUMENTS

| | | | |
|---|---|---|---|
| 513935 | 6/1955 | Canada . | |
| 2532897 | 3/1984 | France . | |
| 477708 | 2/1953 | Italy . | |
| 60-154964 | 8/1985 | Japan . | |
| 61-201987 | 12/1986 | Japan . | |
| 158101 | 1/1921 | United Kingdom | 180/225 |
| 800488 | 8/1958 | United Kingdom . | |
| 819690 | 9/1959 | United Kingdom . | |
| 1537233 | 12/1978 | United Kingdom | 180/229 |
| 2054477 | 2/1981 | United Kingdom . | |
| 2184990 | 7/1987 | United Kingdom | 180/225 |

*Primary Examiner*—Anne Marie Boehler
*Attorney, Agent, or Firm*—Lyon & Lyon

[57] ABSTRACT

A motorcycle of the scooter-type is provided with a frame body supporting an engine unit whose cylinder portion is inclined forwardly. According to one aspect of the invention the frame body is provided with oppositely spaced frame members that mount a fuel tank, the surface of which is recessed to provide a clearance space for reception of the cylinder portion of the engine unit thereby to reduce the effective length required for the vehicle. According to another aspect of the invention a box-like construction forms a helmet-containment chamber for disposition on the frame body between the engine unit and the seat. The construction is particularly adapted to retain a pair of helmets without increasing the effective length of the vehicle by providing a partition that divides the chamber into separate compartments each of which is capable of snugly retaining one of the helmets.

4 Claims, 4 Drawing Sheets

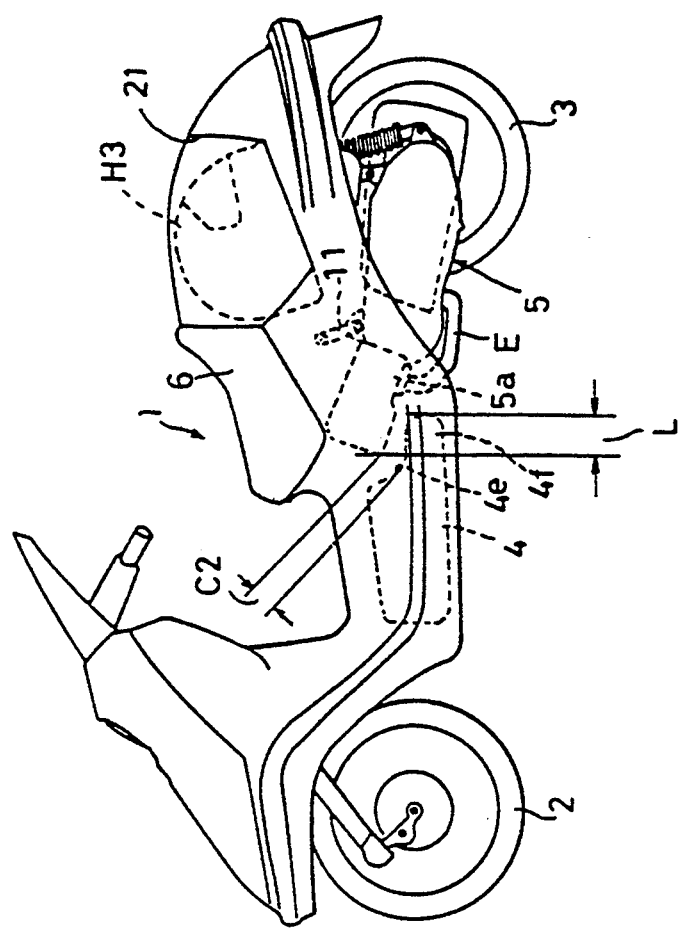
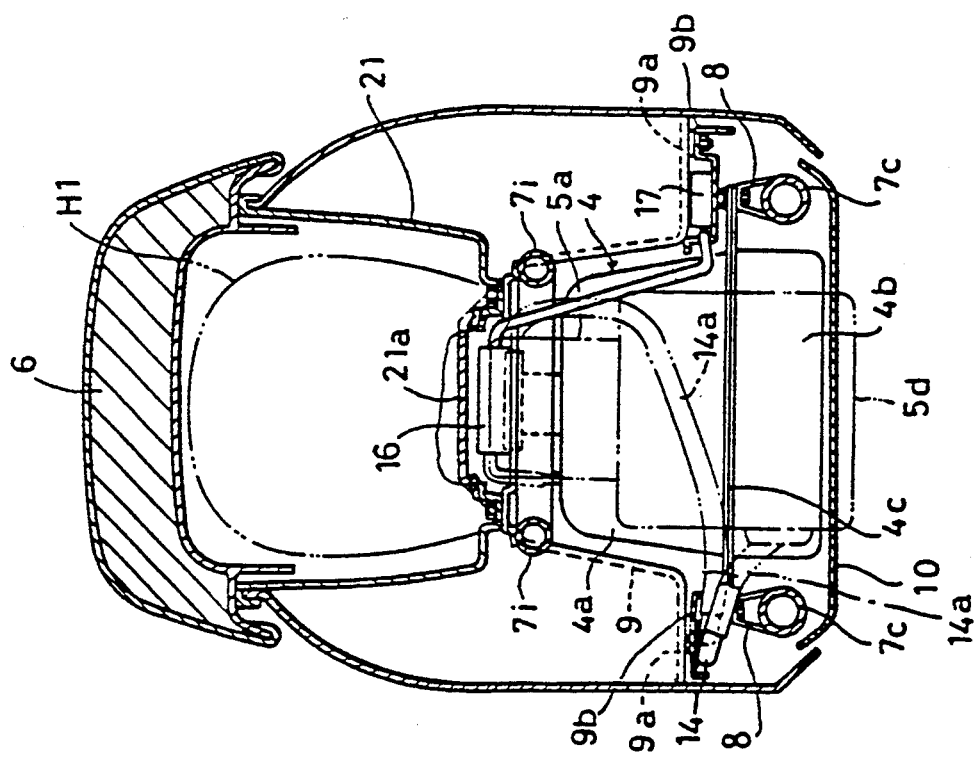

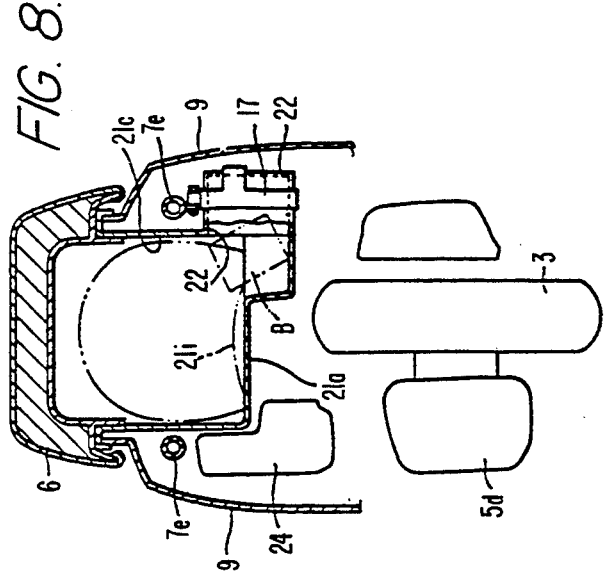
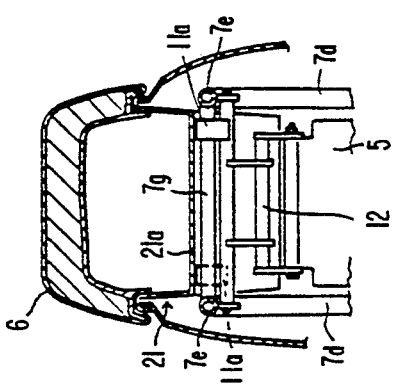
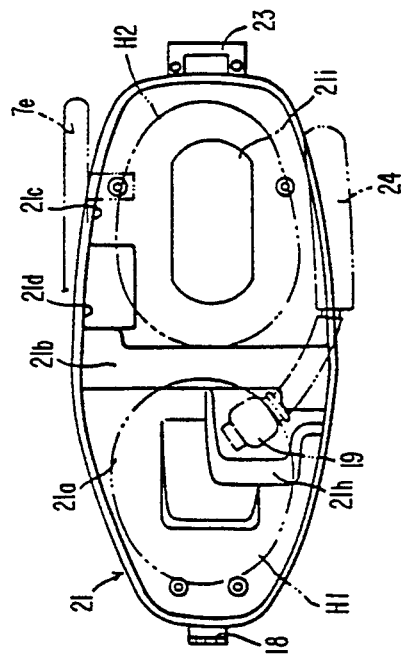
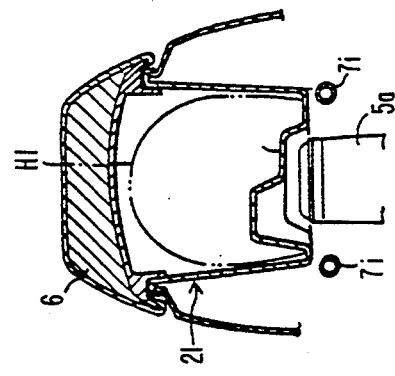

MOTORCYCLE

This application is a continuation of application Ser. No. 07/890,380, filed May 26, 1992, now abandoned, which is a continuation of application Ser. No. 07/686,307, filed Apr. 16, 1991, now abandoned, which is a continuation of application Ser. No. 07/413,907, filed Sep. 27, 1989, now abandoned.

BACKGROUND OF THE INVENTION

The present invention relates to a motorcycle and, more particularly, to a motorcycle, principally of the scooter type, in which a fuel tank and an engine unit are carried between the front and rear wheels.

In such motorcycles of the prior art, a cylinder portion of the engine unit is generally provided to rise at a considerable angle. In contrast with this, from Japanese Patent Laid-Open No. 60-154964 (No. 154964/1985) it is known that the cylinder portion of the engine unit can be made to extend horizontally so as to dispose the fuel tank and the engine unit between the front and rear wheels in a substantially horizontal and rectilinear manner. In the prior art motorcycles, the wheel base is shortened, but the cylinder portion is a hindrance in that the space between the cylinder portion and the seat is reduced. In the motorcycle of Japanese Laid-Open No. 154964/1985, however, because the fuel tank and the engine unit are arranged rectilinearly, a large space is formed between the upper portion of the engine unit and the lower portion of the seat. This advantage is obtained at the cost of having a longer wheel base.

Also, as evidenced by the aforementioned Japanese Patent Laid-Open No. 154964/1985, in motorcycles of the concerned type it is characteristic to provide a chamber beneath the seat that is capable of containing a helmet. Such chambers, however, are typically incapable of containing two helmets beneath the seat. For example, in two seater motorcycles, when a helmet-containing chamber is arranged beneath the seat in order to utilize the lower space of the seat for containing two helmets, one of which is a large sized helmet for driver, there is the inconvenience that the seat height from the ground increases and the vehicle body becomes larger. Also, when a large sized longitudinally extensive containment chamber is provided beneath the seat and it extends over substantially the full length of the seat, if such a motorcycle runs with only one helmet contained in the chamber, there is the problem that the helmet is loose in the chamber and, thus, is shaken during running and thereby becomes damaged.

It is to the amelioration of these problems, therefore, that the present invention is directed.

SUMMARY OF THE INVENTION

It is one object of the present invention, therefore, to provide a motorcycle which seeks to improve the utilizable space in the region above the engine cylinder without having to lengthen the wheel base. In order to attain this object, according to the present invention, there is provided a motorcycle with a fuel tank and an engine unit carried between longitudinally spaced front and rear wheels, characterized in that the fuel tank is formed with a forwardly extending recessed portion on an upper part of the rear wall thereof, and that the engine unit is inclined in a forwardly rising manner so that a front cylinder portion of the engine unit faces the recessed portion at the front end of the cylinder head.

Since the cylinder portion of the engine unit is inclined in a forwardly rising manner and is adapted to face the forward recessed portion formed on the upper part of the fuel tank rear wall positioned forwardly of the engine unit, and the front end of the cylinder portion of the engine unit is positioned lower than the upper surface of the fuel tank, the utilizable space above the cylinder portion is increased. Also, with the engine unit positioned close to the fuel tank, the length of the wheel base is reduced.

It is another object of the present invention to provide a device for containing helmets in a motorcycle wherein the height from the ground to the front portion of the seat is reduced, as is the amount of space required to contain two helmets, and to improve, as a whole, the space efficiency for containing two helmets beneath the seat.

In order to attain the above-mentioned object, the present invention is characterized in that a device for containing helmets in the motorcycle comprises a helmet-containing chamber which is provided beneath the seat and extends over substantially the entire length of the seat to be capable of containing two helmets in longitudinally spaced relation, the helmet-containing chamber having a front containment portion and a rear containment portion and the helmet adapted for containment in the front containment portion being smaller than the helmet contained in the rear containment portion.

According to this aspect of the invention, since the helmet-containing chamber is divided into a front containment portion and a rear containment portion, with the front containment portion capable of containing a small sized helmet and a large sized helmet being adapted for storage in the rear containment portion, the height from the ground to the front portion of the seat is reduced, and the required length of the containment chamber beneath the seat shortened, whereby the need to make the vehicle body larger is avoided.

For a better understanding of the invention, its operating advantages and the specific objectives obtained by its use, reference should be made to the accompanying drawings and description which relate to a preferred embodiment thereof.

BRIEF DESCRIPTION OF THE DRAWINGS

FIG. 2 is a sectional view taken along line II—II of FIG. 1;

FIG. 4 is a side elevational view of another embodiment of a scooter-type motorcycle embodying the present invention;

FIG. 5 is a plan view illustrating the helmet containment chamber of the motorcycle of FIG. 1;

FIG. 6 is a sectional view taken along line VI—VI of FIG. 1;

FIG. 7 is a sectional view taken along line VII—VII of FIG. 1;

FIG. 8 is a sectional view taken along line VIII—VIII of FIG. 1; and

FIG. 9 is a partial exploded view illustrating a lock device for the helmet containment chamber.

DESCRIPTION OF THE PREFERRED EMBODIMENTS

Figure 3:
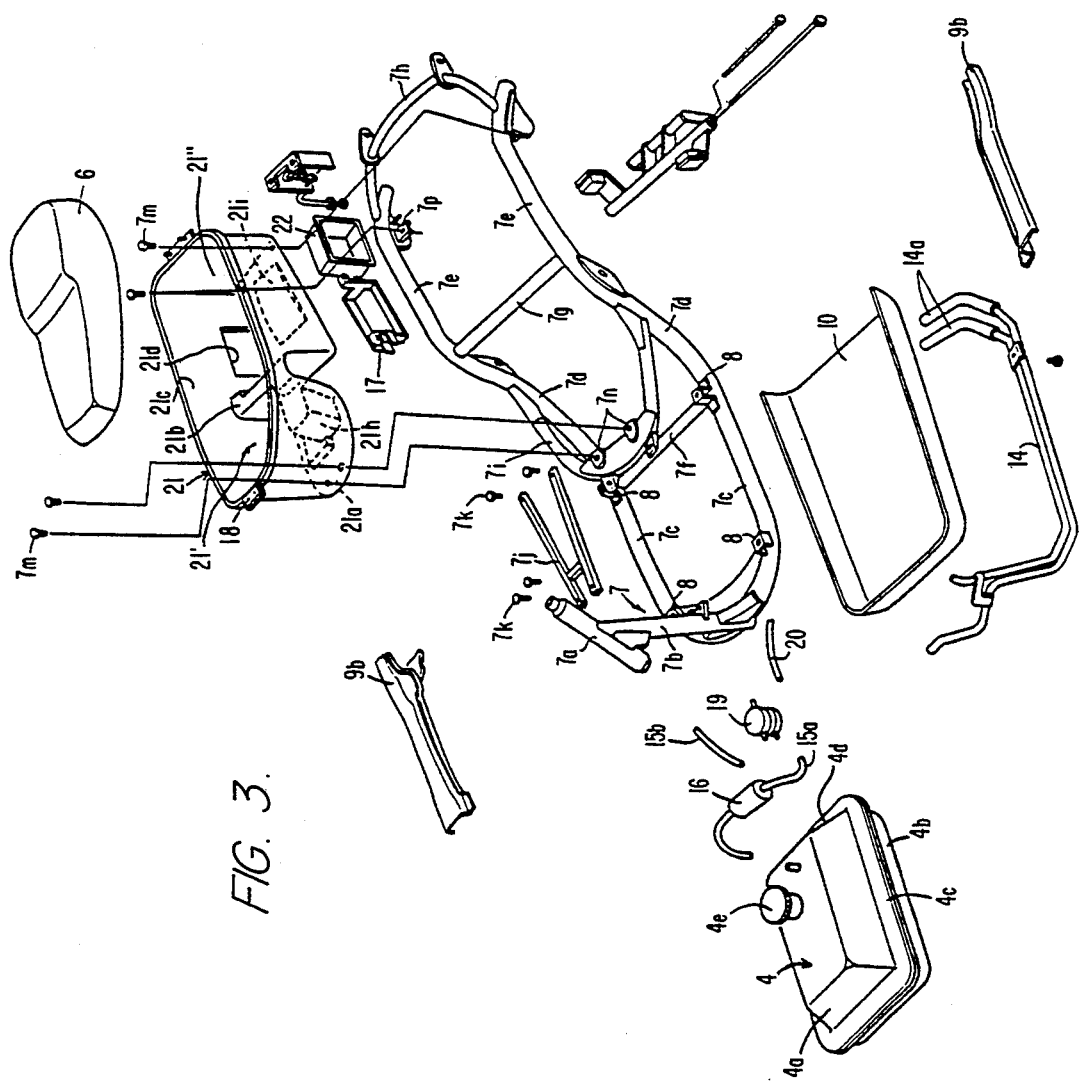
FIG. 3 is an exploded perspective view illustrating certain elemental parts of the motorcycle of FIG. 1.

Referring to the drawings, reference numeral 1 generally indicates a vehicle body which is provided with a front wheel 2 and a rear wheel 3 at the front and rear portions, respectively, thereof. A fuel tank 4 is carried on a middle lower portion between the front and the rear wheels 2 and 3, and an engine unit. 5 is positioned adjacent the rear portion of the fuel tank 4. A seat 6 of a two seater-type vehicle is mounted on a rear upper portion of the vehicle body. Reference numeral 7 generally indicates a vehicle body frame which, as shown in FIG. 3, is provided with a down tube 7b extending downwardly from a head pipe 7a; a pair of lower frames 7c, 7c which diverge in left and right directions from a lower end of the down tube 7b and which extend rearwardly; center frames 7d, 7d which are offset from the lower frames 7c, 7c to rise obliquely upwardly; and rear frames 7e, 7e which are offset from upper ends of the center frames 7d, 7d to extend rearwardly. Each of the left and right lower frames 7c, 7c is connected by a first cross pipe 7f at a rear end portion of the lower frame 7c, by a second cross pipe 7g at an upper end portion of the center frame 7d, and by a third pipe 7h at a rear portion of the rear frame 7e. Also, from the middle portions of the rising frames 7d, 7d is projected in the forward direction an inverted "U"-shaped sub-frame 7i. Further, between the sub-frame 7i and the down tube 7b extend a pair of angle pipes 7j, 7j in the forward direction of the sub-frame 7i. The angle pipes 7j, 7j are detachably fixed to the sub-frame 7i and the down tube 7b at their front and rear positions, respectively, by means of threaded screws 7k, 7k.

Figure 1:
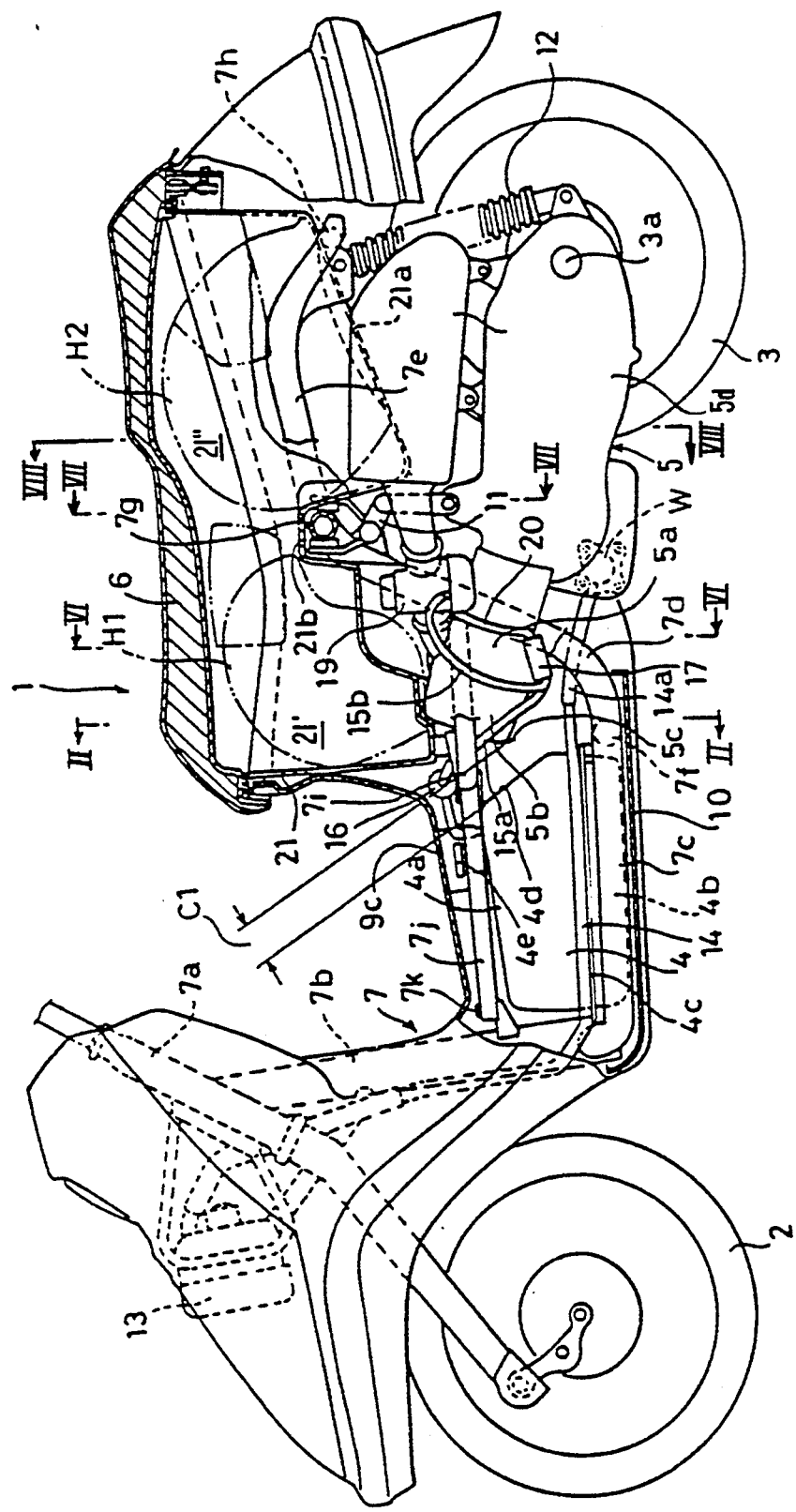
FIG. 1 is a partial sectional elevational view of a scooter-type motorcycle embodying the present invention.

The fuel tank 4 is formed in a generally square shape by welding both upper and lower half bodies 4a, 4b at a flange portion 4c and is fixed to the lower frames 7c, 7c at the flange portion 4c thereof through the intermediary of fixtures 8. Thus, the fuel tank 4 is protected at both sides by both lower frame 7c, 7c which, as shown in FIG. 1, have their lowermost portion below the bottom surface of the fuel tank. At its upper region the fuel tank 4 is protected by the angle pipes 7j, 7j. The tank, thus protected, is surrounded by an upper vehicle body cover 9 forming steps 9a, 9a at its both sides and by a lower cover 10.

A recessed portion 4d is formed in the fuel tank 4, which portion consists of a slanted surface formed in a forwardly rising manner on an upper portion of the rear wall of the fuel tank 4. A cylinder portion 5a located at the front end of the engine unit 5 is provided in a somewhat forwardly rising manner so that the front end 5c of the cylinder head of the cylinder portion 5a faces the recessed portion 4d, whereby the engine unit is adapted to be adjacent to the fuel tank 4 with a clearance C1.

Also, as shown in FIG. 2, the fuel tank 4 has a portion 4a projecting upwardly inside steps 9a, 9a, and refilling port 4e is provided on an upper surface of the projecting portion and covered by a cover 9c provided on the vehicle body 9.

The engine unit 5 consists of a cylinder portion 5a and a unit body 5b which extends rearwardly thereof and which is formed integrally with a crank case and a transmission case. The unit body 5b is supported at a rear portion thereof by a shaft 3a of the rear wheel 3. At its upper middle portion the unit body 5b is pivotally attached to the center frames 7d, 7d through the intermediary of an articulated link 11. At its rear end the unit body 5b is supported by the rear frame 7e through the intermediary of a cushion damper 12, whereby a so-called swing engine unit is constituted. By inclining the cylinder portion 5a in a lower space, as mentioned above, the cylinder portion 5a can be conveniently positioned rearwardly of the fuel tank 4 together with a water pump W that is located in the lower portion of the engine, and engine connections 14a, 14a of a pair of radiator hoses 14, 14 which are connected to a radiator 13 provided in the front portion of the vehicle body 1. These radiator hoses 14, 14 are fixed by means of threaded screws, or the like, to floor stays 9b, 9b supported in front and rear directions by tank securing fixtures 8, 8. Fuel from the fuel tank 4 is supplied through fuel pipes 15a, 15b to a carburetor 19 which is connected. to an air cleaner 24 connected at an upper portion of the engine unit 5 through the intermediary of a filter 16 and a fuel pump 17. To the latter also is connected an air hose 20 which introduces pulsating pressures as a driving source and the fuel pump 17 that is fixed to the floor stay 9b, as shown in FIG. 2.

According to one aspect of the invention, the cylinder portion 5a is arranged to accommodate a helmet containment box 21 between the space between the cylinder portion 5a and the seat 6. The helmet containment box 21 utilizes the seat 6 as its cover and is provided at its front portion with a forward containment box portion 21" which contains a jet-type of helmet H1 disposed to face backwardly, and at its rear portion with a rear containment box portion 21" which contains a large-sized full-face type of helmet H2 also disposed backwardly. The forward portion 21' is positioned above the sub-frame 7i and the rear portion 21" is arranged to fit between the rear frame 7e, 7e, whereby the helmet-containing box 21 is mounted at front and rear portions of its bottom wall 21a by means of screws 7m in mounting bores 7n, 7n provided in the sub-frames 7i and mounting bores 7p, 7p fixed to the rear ends of the rear frames 7e, 7e. The helmet-containment box 21 is provided with a portion 21h which is concave upwardly at a front left side of the bottom plate 21a, the portion 21h being arranged in a positional relationship so that it faces toward the open face portion H1a of the helmet H1 when the latter is contained in the forward portion 21'. The carburetor 19 is arranged beneath the concave portion 21h. The bottom plate 21a is further provided with a concave recess extending upwardly to constitute a partition 21b which divides the helmet-containment box 21 into the front containment portion 21' and the rear containment portion 21". The partition 21b permits the helmets H1, H2 to be contained snugly in the respective compartments 21' and 21" so as not to deviate in the front and rear directions. In the space existing beneath the partition 21b are arranged and provided the second cross pipe 7g and the front and rear stoppers 11a of the link 11. The bottom plate 21a lying beneath the helmet H2 in compartment 21" is provided with a recessed portion 21i sized to avoid the rear wheel 3. Also, as shown in FIG. 8, a battery case 22 is mounted on a middle portion of one of the side walls from outside through the intermediary of a retaining member 17 mounted on the rear frame 7e, whereby a battery B is permitted to be removably attached thereto from an inner opening portion 21d. Further, the air cleaner 24, as shown in FIG. 8, is arranged in a convex shape from between the vehicle body cover 9 and the containment box 21 over the lower surface of the box.

Furthermore, as shown in FIGS. 2 and 9, the seat 6 is adapted to be opened and closed by a hinge 18 which is provided on the front end of the helmet containment box 21, and to be locked by means of a locking device 23 which is provided at the rear end of the containment box, whereby the entire seat 6 is supported by the helmet box.

FIG. 4 shows a scooter-type motorcycle having another structure embodying the present invention. In this embodiment, so as to constitute a vehicle body having a low seat height, the seat 6 is made low by omitting the helmet-containing portion in the aforesaid embodiment provided in the space over the cylinder portion 5a of the engine unit 5. The helmet-containment box 21 in this embodiment is arranged to contain only one helmet H3 rearwardly the seat 6.

The embodiment of the fuel tank 4 shown in FIG. 4 is designed to contain a recessed portion 4e which is provided in a part of the upper wall of the fuel tank facing the lower surface of the forward portion of the cylinder portion 5a of the engine. This part of the cylinder portion 5a is L-shaped in cross section in a direction toward the rear wheel and provides a clearance C2 between the concave portion 4e of the fuel tank 4 and the front end of the cylinder portion 5a. Under the cylinder portion 5a is arranged an extension 4f of the fuel tank 4 with an overlapping length L.

Also, in FIG. 4, the letter, "E", indicates an exhaust tube which is arranged in the space provided rearwardly of the fuel tank 4 and under the cylinder 5a.

According to the first aspect of the present invention, therefore, the described motorcycle has the advantageous effect that the cylinder portion of the engine can be disposed in a low position without having to extend the length of the wheel base.

According to the second aspect of the present invention, on the other hand, since the containment chamber disposed beneath the seat is capable of containing in divided compartments, a small sized helmet in the front portion and a large sized helmet in the rear portion, the containment chamber can contain two helmets without extending its longitudinal length and, moreover, with a reduced height from the ground to a position forwardly of the seat whereby the motorcycle has improved stability during its operation.

It should be further understood that, although a preferred embodiment of the invention has been illustrated and described herein, changes and modifications can be made in the described arrangement without departing from the scope of the appended claims.

We claim:

1. A motorcycle comprising longitudinally spaced front and rear wheels;

a frame body supported by said wheels including a head pipe, a down tube extending downwardly from said head pipe, a pair of center frames that extend rearwardly from said down tube and incline obliquely upwardly and rearwardly and a cross pipe extending between said center frames;

a pair of steps spaced laterally and supported on said center frames;

a seat supported on said frame body, said seat having forward and rear portions, said forward portion being lower in height from the ground than said rear portion;

an engine unit positioned between said front and rear wheels under said seat, said engine unit having a cylinder portion inclined forwardly and positioned between said pair of center frames and above the lowermost portion of said down tube and an articulated link pivotally mounted to said cross pipe and extending downwardly to said engine unit, said engine unit being pivotally connected to said articulated link;

a fuel tank mounted on said center frames forwardly adjacent said engine unit and substantially forward of said seat, said fuel tank rising from said center frames to above said steps, said fuel tank including a wall portion having a recess providing a clearance space between said fuel tank and said cylinder portion, said recess providing said cylinder portion with a clearance space in all positions of pivoted movement of said engine unit; and a helmet-containing chamber disposed between said seat and said engine unit, said chamber being defined by a box construction having a partition extending laterally of said motorcycle frame body intermediate the ends of said chamber to form separate rearwardmost and forwardmost compartments for snugly retaining a pair of helmets in longitudinally spaced relation, each in one of said compartments, the rearwardmost compartment being sized to contain a helmet larger in size than said forwardmost compartment, said cross pipe extending through said partition.

2. A motorcycle according to claim 1 in which said recess comprises a forwardly and upwardly inclined surface on the top of said fuel tank.

3. A motorcycle according to claim 1 in which said recess conforms generally to the cross-sectional shape of said cylinder portion.

4. A motorcycle according to claim 3 in which said fuel tank includes a longitudinal extension underlying said recess.

* * * * *